United States Patent [19]

Hakka et al.

[11] Patent Number: 5,017,350
[45] Date of Patent: May 21, 1991

[54] GAS SCRUBBING PROCESS

[75] Inventors: Leo E. Hakka, Dollard Des Ormeaux; John N. Sarlis, Laval Des Rapides, both of Canada

[73] Assignee: Union Carbide Canada Limited, Danbury, Conn.

[21] Appl. No.: 432,850

[22] Filed: Nov. 7, 1989

Related U.S. Application Data

[63] Continuation-in-part of Ser. No. 360,404, Jun. 2, 1989, Pat. No.

[51] Int. Cl.$^5$ ............................................. C01B 17/00
[52] U.S. Cl. ..................................... 423/243; 423/242
[58] Field of Search ............ 423/243, 228, 229, 242 A, 423/242 R

[56] References Cited

U.S. PATENT DOCUMENTS

| | | | |
|---|---|---|---|
| 1,132,679 | 3/1915 | Murray et al. | 423/242 |
| 3,877,673 | 3/1975 | Teague et al. | 423/243 |
| 4,067,703 | 1/1978 | Dullien et al. | 55/92 |
| 4,208,387 | 6/1980 | Klass et al. | 423/243 |

OTHER PUBLICATIONS

Spink, "Handling Mists and Dusts", *Chemtech*, 6/88, pp. 364–368.

*Primary Examiner*—Gregory A. Heller
*Attorney, Agent, or Firm*—Paul W. Leuzzi, II

[57] ABSTRACT

Components are removed from gas streams by contact in a contact zone with finely-divided droplets of reversible liquid sorbent wherein a portion of the droplets is coalesced, which droplets contain a concentration of component sorbed greater than that predicted by vapor-liquid equilibrium at the condition of the gas stream at the exit of the contact zone.

19 Claims, 1 Drawing Sheet

GAS SCRUBBING PROCESS

This is a continuation-in-part of U.S. patent application Ser. No. 360,404, filed June 2, 1989, now abandoned which in turn is a continuation-in-part of U.S. patent application Ser. No. 273,028, filed Nov. 19, 1988 now abandoned.

FIELD OF THE INVENTION

The present invention relates to processes for removing components from gas streams by contact with finely-divided droplets of reversible sorbents for the components to be removed.

BACKGROUND TO THE INVENTION

Numerous processes have been proposed for the removal of components from gas streams including liquifaction, adsorption, absorption, momentum separation, and the like. One common procedure is through contact with a liquid sorbent in which the component to be separated is preferentially sorbed. The sorption may be physical sorption in which the component is soluble in the liquid sorbent or chemisorption in which a chemical reaction occurs with the sorbent. For instance, the sorption of sulfur dioxide in water is defined herein as being a physical sorption and the sorption of sulfur dioxide by calcium hydroxide to form calcium sulphite is defined herein as being a chemisorption. The chemisorption may be essentially irreversible, e.g., the reaction of calcium hydroxide with sulfur dioxide to produce calcium sulphite is essentially irreversible, or reversible, e.g., hydrogen sulfide sorption by alkanolamine. The gas liquid contact mechanisms that have been proposed include tray columns, packed columns, spray columns, etc.

Sorption processes have been proposed to remove widely varying components from widely varying gas streams. For instance, the removal of carbon dioxide and/or hydrogen sulfide and/or sulfur dioxide from natural gas, air, flue gas, petrochemical streams, etc. Sorption processes can recover volatilized catalysts from process streams. In many of these sorption processes, commercial viability depends, in part, upon the efficiency and capacity of the liquid sorbent, the ability of the liquid sorbent to be regenerated and the energy consumption of the sorption process. For example, a sorption process should not result in undue pressure drop to the gases being treated, especially with large volume gases such as flue gases, nor should unduly large amounts of energy be consumed in regenerating the liquid sorbent.

One type of apparatus which does not result in undue pressure drop is known as the "Waterloo" scrubber and is described by Spink in "Handling Mists and Dusts", *Chemtech.* June, 1988, pages 364 to 368. U.S. Pat. No. 4,067,703 discloses a Waterloo scrubber for the removal of particulates. According to the article, U.S. patent application Ser. No. 20963, has been filed on the use of the Waterloo scrubber as a chemical reactor. The Waterloo scrubber comprises a duct in which the gas to be scrubbed flows and atomizing nozzles spray liquid into the passing gas stream. The gas then passes into a turbulent mixing zone (i.e., a slow moving centrifugal fan) which serves to agglomerate the liquid to provide larger droplets that can be readily separated from the system. An entrainment separation zone can follow the turbulent mixing zone for further recovery of liquid. Since much of the liquid can be removed in the turbulent mixing zone, the pressure drop caused by the entrainment separation zone is much less than if the entrainment separation zone was required to remove substantially all of the liquid.

In his article, Spink states that:

"The Waterloo $SO_2$ scrubber can remove more $SO_2$ at a much lower L/G [Liquid-to-Gas] ratio than other scrubbers while employing the same scrubbing media." (Page 366)

He reports the use of ammonia, MgO-containing lime, sodium sulfite solution and iron oxide slurry as various reagents for sulfur dioxide removal.

Sorption processes are sought which effectively use the capabilities of liquid sorbents while still obtaining the benefits of low pressure drop scrubbers such as spray towers and Waterloo scrubbers.

SUMMARY OF INVENTION

By this invention, sorption processes are provided to remove components from gas streams with little pressure drop yet with effective use of liquid sorbents. In the processes of this invention, liquid sorbent in the form of finely-divided droplets, is contacted in a contact zone having a gas entrance and a remote gas exit with gas containing at least one component which at least one component is capable of being reversibly sorbed by the liquid sorbent, wherein the gas preferably has a velocity above the critical settling velocity of the droplets and, preferably, the droplets have velocity components parallel to and normal to the direction of gas flow. The contact of the droplets is for a time sufficient for the at least one component to be sorbed such that a portion of the droplets contain a concentration of the at least one component greater than the projected vapor-liquid equilibrium concentration at the conditions of the gas at the gas exit. A portion of the droplets is coalesced in the contact zone while the droplets contain a concentration of the at least one component greater than the projected vapor-equilibrium concentration at the conditions of the gas at the gas exit, and these coalesced droplets are contacted with gas having a vapor-liquid equilibrium concentration of the at least one component below the concentration of the at least one component in the droplets and are removed from the contact zone before they equilibrate with said gas.

In a preferred aspect of the invention, at least 30 percent by volume of the liquid droplets are coalesced within the contact zone and the coalesced liquid, on average, contains at least about 10 mole percent greater concentration of the at least one component than projected at vapor-liquid equilibrium at the conditions of the gas as it exits from the contact zone. In another preferred aspect of the invention, the droplets comprise at least one physical sorbent for the at least one component and at least one chemisorbent for the at least one component, which chemisorbent may be dissolved in the physical sorbent. Advantageously, the at least one component is sorbed by the physical sorbent prior to being chemisorbed.

In a further preferred aspect of this invention, a gas stream containing sulfur dioxide is contacted with an absorbing medium in the form of finely-divided liquid droplets. The absorbing medium contains (i) water and (ii) an amine absorbent (amine sorbent) having at least one amine group which, when in its free form, is a group having a pKa, (as determined in an aqueous medium at 25° C.), of about 4.5 to 7.3, preferably 4.5 to 6.7.

A pKa is the negative logarithm of the ionization constant of the conjugate acid of the base. This amine group is referred to herein as a "sorbing nitrogen".

GENERAL DESCRIPTION OF THE INVENTION

Figure 1:
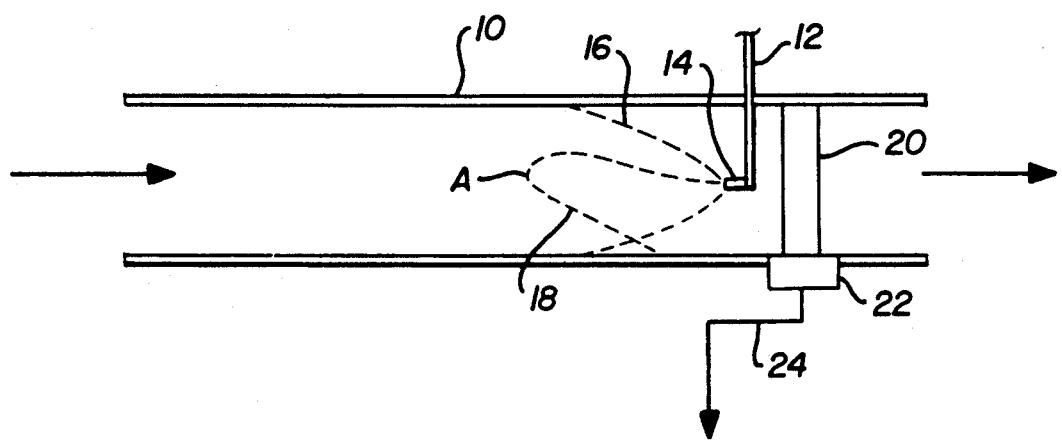
FIG. 1 is a simplified diagram of an apparatus for use with a process according to one embodiment of the invention having a countercurrent liquid sorbent spray.

In the processes of this invention, liquid sorbent in the form of finely-divided droplets is contacted with a gas stream containing at least one component to be sorbed by the liquid sorbent. By the liquid sorbent being finely-divided, advantages are obtained in the greater surface area available for gas-liquid contact for a given volume of gas and liquid sorbent and in the lower pressure drop posed by the droplets to the gases passing through the contact zone. Often, the average diameter of the droplets is less than about 200 microns, e.g., between about 5 and 80 or 100 microns, and sometimes between about 20 and 70 microns. The droplets can be formed by any suitable atomization or spray apparatus including, but not limited to, spray nozzles, gas-assisted spray nozzles, spinning disk atomizers, etc. Often these devices produce a distribution of droplet sizes. Usually, the particle size distribution is such that at least about 50 percent by volume of the droplets are within 20 microns of the average droplet size.

Unlike conventional countercurrent spray towers which use sufficiently large droplets to avoid undue entrainment in the upwardly flowing gases, the finely-divided droplets used in the processes of this invention can be readily fluidized or entrained by even relatively low velocity gases. In the processes of this invention, the velocity of the gases contacting the finely-divided droplets is preferably above the critical settling velocity, or critical fluidization velocity. The critical settling velocity, or critical fluidization velocity, is that gas velocity at which the average particle size droplet would be suspended in an up-flow, vertical vessel having the same cross-sectional shape and dimensions of the contact zone. The critical fluidization velocity, of course, varies with cross-sectional shape and dimensions of the contact zone, droplet size and droplet density.

Often, the average linear velocity of the gases containing the at least one component to be removed is at least about 1.5 meters per second, e.g., about 1.5 or 3 to 15 or more meters per second, and the flow is non-laminar.

The contact zone may have any suitable cross-sectional configuration, provided that the droplets of liquid sorbent are capable of being sufficiently distributed across the cross-section to effect the sought sorption. The cross-section may thus be circular, oval, square, rectangular, hexagonal, octagonal, etc. Frequently, the aspect ratio (maximum to minimum dimension) of the cross-sectional configuration of the contact zone is between about 3:1 to 1:1, preferably, 1.5:1 to 1:1. The cross-sectional area is also selected, in part, on the ability to distribute adequate droplets of liquid sorbent throughout the cross-section. A further consideration, as is explained later in more detail, is the ability of the finely-divided droplets to coalesce into larger masses of liquid. Since the walls of the contact zone can serve as surfaces to promote coalescing, the cross-sectional area is generally such that a significant portion of the droplets can readily contact the walls upon sorbing desired amounts of the at least one component. Cross-sectional areas of contact zones frequently range from about 100 square centimeters to 15 or more square meters, say, about 0.02 to 10 square meters.

The contact zone may be oriented in any suitable direction. The zone may be vertical with up-flow or down-flow gases, or non-vertical. Preferably the zone is substantially horizontal, i.e., within about 15 degrees, say, within about 10 degrees, of horizontal. In many instances, the substantially horizontal orientation takes advantage of the effect of gravity on the droplets and facilitates droplets contacting the lower walls of the contact zone.

The finely-divided droplets of liquid sorbent may be provided by any suitable means in the cross-section of the contact zone. Generally, the finely-divided droplets of liquid sorbent are introduced as in a fan spray or cone spray pattern from a central portion of the cross-section, and the spray is cocurrent or countercurrent to the flow of the gases containing the at least one component to be removed. Thus, finely-divided droplets are provided with a radial velocity component. (The direction of flow of the gases is herein defined to be axial.) Frequently, the spray patterns encompass an angle of between about 5 degrees to 90, degrees say, 10 degrees to 40, degrees. The spray pattern angle, especially at the outer portions of the spray pattern, is a determinant of the contact time of droplets, with the gases prior to the droplets contacting a wall of the contact zone. Advantageously, the finely-divided droplets of liquid sorbent used in the processes of this invention enhance the gross rate of sorption due to the high surface area per unit volume of sorbent. Thus, even in relatively short periods of residence time of the finely-divided droplets between their generation and contact with a surface, substantial amounts of the at least one component can be sorbed.

With countercurrent spray, which is generally preferred, the axial velocity of finely-divided droplets is decreased by the gases and, unless, for instance, the droplets contact a surface, they are reversed in axial velocity. With cocurrent sprays, the droplets become entrained in the flow of the gases and generally tend toward the same axial velocity as that of the gases. In any event, regardless of which of the above spray patterns are used, a substantial portion of the droplets contacts gases rich in the at least one component to be removed and then contacts gases which contain a lesser concentration of the at least one component to be removed. Because the liquid sorbent is a reversible sorbent, the concentration of the at least one component in the liquid sorbent and in the gases, will tend toward equilibrium, i.e., vapor-liquid equilibrium. At equilibrium, the concentration of the at least one component to be removed in the liquid sorbent and in the gases will be defined by the vapor-liquid equilibrium curve for the system.

In accordance with the processes of this invention, the finely-divided droplets of liquid sorbent contact gases rich in the at least one component to be removed and thereafter contact gases having lesser concentrations of the at least one component to be removed. A portion of the finely-divided droplets of liquid sorbent which have contacted the rich gases are coalesced to form larger bodies of the liquid sorbent (e.g., droplets or films) with lower area-to-volume ratios. The lower area-to-volume ratios retard the gross rate of sorption and desorption from the liquid bodies. Advantageously, the coalesced liquid, if in the form of droplets, has an average diameter of at least about 5, say, 10 to 50 or more, times greater than the average diameter of the finely-divided droplets. Preferably, at least a portion of the coalesced droplets form a continuous film or stream which passes to an effluent port from the contact zone.

Coalescing the droplets may be by any suitable means. If pressure drop considerations are important, then any means for promoting the coalescing should render minimal resistance to the flow of the gases. Conveniently, the walls of the contact zone are used as at least a portion of the means to coalesce the finely-divided droplets. The use of the walls minimizes any pressure drop to the gases. Other means to enhance coalescing include the provision of contact surfaces within the cross-section of the contact zone. Solid surfaces are generally preferred since liquids may tend to dilute the liquid sorbent and make recovery and/or regeneration more complex.

Often at least about 30, say, 30 to 70, volume percent of the finely-divided droplets of liquid sorbent are coalesced prior to the exit of the contact zone. Preferably, a significant portion of the finely-divided droplets are coalesced when the concentration of the at least one component in the liquid sorbent is at least about 10 percent greater than the projected vapor-liquid equilibrium concentration at the conditions of the gases as they exit from the contact zone. The projected vapor-liquid equilibrium concentration as referred to herein is the concentration of the at least one component in the liquid sorbent at equilibrium with the concentration of the at least one component in the gases. The temperature and pressure of the gases as they exit the contact zone are used to ascertain the vapor-liquid equilibrium relationship. The exit of the contact zone is the region at which either substantially all of the remaining, non-coalesced liquid sorbent is removed from the gases or, if the gases still contain liquid sorbent, the gases are subjected to another unit operation such as another sorption stage, chemical reaction, heat exchange, etc. In some instances, at least about 30 percent of the finely-divided droplets are coalesced when they have a concentration of the at least one component to be removed at least about 10 percent greater than the projected vapor-liquid equilibrium at the contact zone outlet conditions.

In preferred aspects of this invention, the liquid sorbent comprises both physical sorbent and chemisorbent for the at least one component to be removed. Without wishing to be bound by theory, the use of two types of sorbents is believed to enhance the ability of the liquid sorbent to recover the at least one component from gases. The sorption may occur by first sorbing the at least one component in the physical solvent. The at least one component in the physical solvent tends toward equilibrium with the at least one component associated with the chemisorbent. Thus, when some of the at least one component is desorbed to the surrounding gas due to equilibrium considerations, the equilibrium concentration of the at least one component associated with the chemisorbent changes and reactions proceed to de-chemisorb some of the at least one component from the chemisorbent. Approaching equilibria requires finite times. Therefore, the addition of a chemisorption to physical sorption step provides additional time to effect coalescing while the droplet may have a concentration of the at least one component above the projected vapor-liquid equilibrium concentration at the conditions of the exit of the contact zone.

Not all the liquid sorbent will be coalesced in the contact zone. Generally a coalescing means is provided at the exit from the contact zone to remove substantially all remaining, entrained liquid sorbent from the gases. Suitable coalescing means include demisters, centrifugal fans, chevrons and the like. The residence time of a finely-divided droplet in the contact zone varies depending upon its axial and radial velocity components and the length of travel within the contact zone. In general, the average contact time is less than about 2 seconds, e.g., about 0.001 to 1, say about 0.01 to 0.5, second. Typically, some finely-divided droplets have a much shorter residence time than others, e.g., about 60 percent or less of the average residence time and others about 150 percent or more of the average residence time.

The ratio of liquid to gases containing the at least one component to be removed may vary widely. Factors considered include the amount of the at least one component sought to be removed, the concentration of the at least one component in the gases to be treated, the capacity of the liquid sorbent for the at least one component to be removed, the rate of sorption, and the configuration of the contact zone including cross-sectional dimensions. Often, the ratio of liquid sorbent to gas is about 0.001 to 5, e.g., about 0.01 to 1, liters per cubic meter.

The processes of this invention can be used to treat a wide variety of gas streams to remove a wide variety of components. Virtually any liquid sorption process using reversible sorbent can find adoption in the processes of this invention. Exemplary streams for treatment include, but are not limited to, natural gas streams (e.g., to remove carbon dioxide or hydrogen sulfide), petroleum gas streams (e.g., to remove carbon dioxide, hydrogen sulfide, acetylene, etc.), petrochemical gas streams (e.g., to remove vaporized catalysts, carbon monoxide, carbon dioxide, polar organics, non-polar organics, hydrogen sulfide, sulfur dioxide, nitrogen oxides, etc.), combustion gas streams (e.g., to remove nitrogen oxides, carbon dioxide, sulfur dioxide, etc.), and air (e.g., to remove halogenated hydrocarbons such as trichloroethylene; solvents including oxygenated solvents such as acetones, ketones, glycol ethers and the like; nitrogen oxides: carbon monoxide: carbon dioxide; hydrogen sulfide; mercaptans; and sulfur dioxide). Physical solvents include water, hydrocarbons (especially pentane, hexane, cyclopentane, cyclohexane, benzene, toluene and xylene), ethers (e.g., diethyl ether, cryptands, polyethylene glycols, glyme, tetraglyme, etc.), alcohols (e.g., methanol, ethanol, propanol, isopropanol, t-butanol, ethylene glycol and diethylene glycol), and nitrogenous compounds (e.g., aniline, pyridine, pyrimidine, pyrrolidone, etc.). Chemisorbents include amines, alkanolamines such as diethanolamine and triethanolamine, alkylalkanolamines such as methyl diethanolamine, weak carboxylic acids, transition metal ions such as $Fe^{+2}$, Mo, Cu, Ag, Cr, and Co, aldehydes such as benzaldehyde, carbonates such as potassium carbonate, halogenated hydrocarbons, urea etc. Advantageously, the chemisorbents do not obey Henry's law, i.e., the vapor-liquid equilibrium relationship between the concentration of the at least one component to be removed in the gas and the concentration of the at least one component to be removed in the liquid sorbent is non-linear. Often the vapor-liquid equilibrium curve is at least partially below the linear relationship for Henry's law.

A particularly preferred use of the processes of this invention is to remove sulfur dioxide from effluent gases from combustion processes and smelters.

The amine sorbent used advantageously has at least one amine group ("sorbing nitrogen") which exhibits a pKa of between about 4.5 and 6.7. Because the pKa of an amine varies with temperature, for the sake of uniformity, all pKa measurements are made at 25° C. in an aqueous medium.

The amine sorbent may be a monoamine or may have two or more amine groups. In a preferred embodiment, the amine contains a salt group which is substantially non-regenerable under the absorbing and regeneration conditions. The salt tends to reduce the vapor pressure of the amine sorbent. Most conveniently, the salt function is provided by at least one other amine group on the amine sorbent.

Generally, in the sorbing medium the amine salt absorbent comprises at least about 50, preferably at least 70, e.g., 75 to essentially 100 mole percent of the total amine capable of absorbing sulfur dioxide.

Because of availability and lower molecular weight, diamines are preferred for the amine salt absorbent. Diamines are often used due to their commercial availability and generally low viscosity and preferably have a molecular weight less than about 300, preferably less than about 250. The amines, e.g., diamines preferably are tertiary diamines, in view of their stability. However, other diamines in which one or both of the nitrogens is primary or secondary and which otherwise meet the critical parameters discussed below may be employed, provided mild oxidative or thermal conditions exist to minimize chemical reaction of the solvent. Often, the preferred amine salt absorbents have a hydroxyalkyl group as a substituent on an amine group. In some instances, the hydroxy substituent is believed to retard the oxidation of sulphite or bisulphite to sulphate. Specifically preferred compounds are N,N'N'-(trimethyl)-N-(2-hydroxyethyl)-ethylenediamine (pKa=5.7); N,N,N',N'-tetramethylethylenediamine (pKa=6.1). N,N,N''N'-tetrakis (2-hydroxyethyl) ethylenediamine (pKa=4.9); N-(2-hydroxyethyl) ethylenediamine (pKa=6.8); N,N.-dimethylpiperazine (pKa=4.8); N,N,N',N.-tetrakis (2-hydroxyethyl)-l, 3-diaminopropane; and N',N'-dimethyl-N, N-bis(2-hydroxyethyl) ethylenediamine. Also included among the useful diamines are heterocyclic compounds, such as piperazine (pKa=5.8). The pKa values are for the sorbing nitrogen.

The absorbing medium contains at least one mole of water and usually more for each mole of sulfur dioxide to be removed from the gas stream. The water acts both as a solvent for the amine and as an absorber for the sulfur dioxide. The proportion of water present is up to about 80 weight percent of the absorbing medium, preferably about 25 to about 50 weight percent of the absorbing medium.

It is not essential that the amine sorbent and water be miscible under any of the conditions of the process, nor is it essential that the amine sorbent be liquid under all the conditions of the process. Frequently, the solubility of the amine sorbent in water is at least about 0.01, often at least about 0.1, mole per liter at 25° C. Preferably, the amine sorbent is miscible with water under the conditions in the process.

The amine sorbent (calculated as the free amine) often comprises at least about 20 weight percent of the absorbing medium, e.g., about 20 to 90, say, about 25 to 75, weight percent of the absorbing medium. The amount of amine sorbent is preferably in an amount sufficient to provide a spent absorbing medium containing at least about 100 grams of sulfur dioxide per kilogram of absorbing medium. The amount of amine sorbent, however, should not be so great as to unduly increase the viscosity of the absorbing medium such that suitable spray droplet sizes cannot be feasibly obtained. Preferably, the viscosity of the absorbing medium is below about 1200 centipoise at 25° C., e.g., between about 1 and 500 centipoise at 25° C.

The absorbing medium may contain mixtures of amine sorbents. Other components, e.g., alkali salts, may be present as additives to, for instance, retard sulphite or bisulphite oxidation, maintain pH and serve as cosolvents.

The contact of the absorbing medium with the sulfur dioxide-containing gas stream is effected within the temperature range of up to about 60° C., often about 10° to about 60° C., preferably about 10° to about 50° C., and is effected to obtain a loading of sulfur dioxide of at least 100 grams, preferably about 200 to about 400, of sulfur dioxide per kilogram of absorbing medium.

Without wishing to be limited to theory, it is believed that when sulfur dioxide is dissolved in water, bisulphite ion is formed. The bisulphite ion is then ionically associated with the sorbing nitrogen of the amine sorbent. In order to effect high removal of the sulfur dioxide and energy efficient regeneration, the pH of the absorbing medium should be maintained such that the bisulphite/sulphite equilibrium favors bisulphite in the spent absorbing medium. To a significant extent, the amine sorbents with a pKa in the range of about 4.5 to 7.3, tend to buffer the spent absorbing medium in a range favoring the presence of bisulphite, e g., a pH of about 4 to 6.

The pH of the absorbing medium is generally in the range of about 4 to about 7.5 during the absorption process. Usually the absorbing medium initially has a pH close to the upper end of this range, preferably about 6.5 to about 7.5, and, as sulfur dioxide is absorbed and the solution tends to become more acidic, the pH moves towards the lower end of the range.

If the absorbing medium has a higher pH, then the sulfur dioxide is absorbed as sulphite ion and stripping of a significant proportion of the absorbed sulfur dioxide thereby becomes difficult to achieve. If the pH is too low, then little sulfur dioxide is absorbed under normal atmospheric pressure conditions from the dilute sulfur dioxide gas streams normally encountered.

With reference to FIG. 1, a contact zone which can be operated in accordance with the processes of this invention is schematically depicted. Conduit 10 is provided which has an inlet adapted to receive incoming gases containing at least one component to be removed in the direction passing in the direction of the arrow.

Pipe 12 is adapted to transport liquid sorbent to spray head 14 which is oriented to spread a conical pattern 16 of finely-divided liquid sorbent countercurrent to the flow of gas. Dotted line 18 depicts the path of travel of a droplet. As shown, the droplet proceeds in an axial direction countercurrent to the flow of the gases with its forward motion decelerating, and the particle eventually reversing in axial movement and moving in the direction of the gas flow. The path also shows the effect of gravity on this droplet. The droplet, as depicted, passes from a gas rich in the at least one component to be removed at point A to a region in which the gas is leaner in the at least one component to be removed. Downstream of the spray nozzle 14 is demister 20 to coalesce remaining droplets entrained in the gas. The liquid sorbent from the walls of conduit 10 drains toward receptacle 22 positioned beneath demister 20 and receptacle 22 collects the liquid sorbent from both the walls and demister, and line 24 is adapted to remove the coalesced liquid sorbent from the system.

Figure 2:
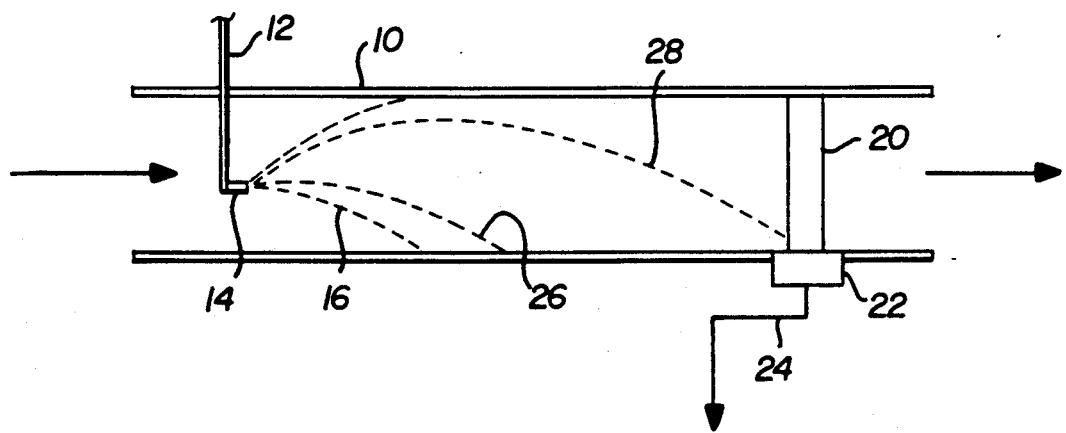
FIG. 2 is a simplified diagram of an apparatus for use with a process according to one embodiment of the invention having a cocurrent liquid sorbent spray.

In FIG. 2, like parts bear the same reference numbers as in FIG. 1. In FIG. 2, the spray is co-current with the flow of the gases. The paths of droplets 26 and 28 are depicted and the effect of gravity on the droplets is shown.

The following examples are provided by way of further illustration of the invention and are not in limitation thereof. All parts and percentages of solids are by weight and of liquids and gases by volume unless otherwise indicated.

EXAMPLE 1

A synthetic regenerated absorbing medium is prepared by mixing 360 pounds (164 kilograms) of N,N',N'-trimethyl-N-(2-hydroxyethyl)ethylenediamine, 123 pounds (56 kilograms) of 98 percent sulfuric acid, and 1080 pounds (491 kilograms) of steam condensate. This mixture exhibits a pH of about 7.76.

This mixture is sprayed into a duct through which a synthetic sulfur dioxide-containing stream is passed. The duct is about 12 inches (30.5 centimeters) in diameter and contains three atomization nozzles in series (nozzle 1 being closest to the outlet of the duct) using atomizing air at about 50 pounds per square inch gauge (3.4 atmospheres). When more than one nozzle is used, the lean solvent is passed through nozzle 1, the recovered solvent from nozzle 1 is then passed to nozzle 2 and then from nozzle 2 to nozzle 3, when used, to effect maximum loading of the solvent. The atomized droplets are believed to be about 20 to 35 microns in diameter. At the outlet end of the duct is a radial fan of about 30 inches (76 centimeters) in size. Spent solvent is recovered from the fan casing and a downstream demister. Sulphur dioxide is mixed into an air stream at 22° C. and 40 percent relative humidity and the stream is passed through the duct. Table III summarizes the test runs, conditions and results. Demisters are present after each of nozzle 3 and nozzle 2 and the solvent $SO_2$ loadings reported in Table III are based on fluid recovered from the downstream demister.

EXAMPLES 2 to 6

In these examples a plexiglass, circular cross-section conduit having an internal diameter of about 29.2 centimeters is placed on an incline of about 2 degrees from horizontal with the inlet end being elevated A Kimre TM Mist Eliminator Model 16/96 available for Kimre Incorporated, Perrine, Fla., U.S.A., is placed at the other end of the conduit. A 2 millimeter CALDYN TM air-assist spray nozzle available for Caldyl Apparatebau GmbH, Ettlingen, Federal Republic of Germany, is axially positioned within the conduit and liquid sorbent and air lines pass to the nozzle.

In the examples, air is mixed with metered amounts of sulfur dioxide and is passed through the conduit at approximately ambient pressure and 17° C. The air to the nozzle is maintained at about 60 pounds per square inch gauge (about 5 atmospheres absolute) to spray a liquid sorbent solution containing a synthetic medium similar to that described in Example 1. The liquid is metered using a helical gear pump and is at a temperature of about 17° C. The spray cone is about 12 degrees to 15 degrees total angle with the average droplet size being about 50 microns with a distribution of droplets in the range of about 20 to 100 microns. In the countercurrent examples (Examples 1, 2, 3, 4, and 6) the face of the nozzle is about 7 to 8 centimeters from the mist eliminator and the spray plume extends about 85 to 90 centimeters from the face of the nozzle. In the cocurrent example (Example 5) the face of the nozzle is about 130 to 135 centimeters from the mist eliminator and the spray plume extends to the mist eliminator. The sulfur dioxide concentration of the absorbing medium is determined by pH measurement and the sulfur dioxide concentration in the air is determined by on-line infrared spectroscopy.

The examples are summarized in the following table.

| Example | Air flow Actual Cubic Feet Per Minute | Liquid Sorbent Feed Rate l/min. | $SO_2$ in Air ppmv In | $SO_2$ in Air ppmv Out | $SO_2$ Sorption moles/mole of Amine |
|---|---|---|---|---|---|
| 2 | 718 | 1.070 | 1500 | 500 | 0.32 |
| 3* | 717.5 | 1.154 | 1500 | 580 | 0.43 |
| 4 | 717.5 | 1.154 | 2900 | 1300 | 0.52 |
| 5 | 717.5 | 1.154 | 1500 | 580 | 0.48 |
| 6 | 717.5 | 0.92 | 1450 | 540 | 0.42 |

*Nozzle tilted from axial orientation and non-uniform spray distribution existed.

TABLE III

Pilot Plant Test Results

| NOZZLES OPERATING 1 | 2 | 3 | $SO_2$,ppmv[2] IN FEED | $SO_2$,ppmv[2] AFTER TREATMENT | SOLVENT FEED U.S. GALLONS PER MINUTE | DUCT AIR FLOW ACTUAL CUBIC FEET PER MINUTE | SOLVENT $SO_2$ LOADING mole $SO_2$ per mole of amine After Nozzle 1 | After Nozzle 2 | After Nozzle 3 | NOTES |
|---|---|---|---|---|---|---|---|---|---|---|
| X | | | 1460 | 300 | 0.18 | 350 | 0.19 | | | 1 |
| X | X | | 1350 | 0 | 0.05 | 350 | 0.28 | 0.68 | | |
| X | X | | 2250 | 100 | 0.05 | 350 | 0.30 | 0.85 | | |
| X | X | | 1600 | 40 | 0.05 | 350 | 0.33 | 0.89 | | |
| X | X | X | 2090 | 110 | 0.05 | 350 | 0.20 | 0.53 | 0.76 | 1 |
| X | X | X | 2040 | 0 | 0.15 | 350 | 0.11 | 0.37 | 0.60 | |
| X | X | | 1710 | 0 | 0.15 | 410 | 0.16 | 0.36 | | |
| X | | | 1400 | 100 | 0.15 | 430 | 0.31 | | | |

[1] Not run long enough to equilibrate solvent $SO_2$ loading.
[2] Accuracy of $SO_2$ concentration is ± 50 ppmv.

In each of the examples, approximately 40 to 50 percent of the liquid sorbent contacts and is coalesced on the walls of the conduit.

It is claimed:

1. A process for the removal of sulfur dioxide from a sulfur dioxide-containing gas stream comprising contacting said gas stream in a substantially horizontal contact zone with finely-divided droplets of absorbing medium which comprises (i) water in an amount of at least about 1 mole for each mole off sulfur to be absorbed up to about 80 weight percent of the absorbing medium and (ii) amine sorbent having at least one amine group which is, when in free form, a group having a pKa in an aqueous medium at 25° C. of about 4.5 to 6.7, at a temperature up to about 60° C., wherein the velocity of the gas stream is at least about 1.5 meters per second and the contact is for a time sufficient that a portion of the finely-divided droplets sorbs sulfur dioxide to provide a concentration of sulfur dioxide in the portion of liquid droplets greater than the projected vapor-liquid equilibrium concentration under the conditions of the gas stream as it exits from the contact zone, coalescing in the contact zone a portion of the droplets which contain a greater concentration of sulfur dioxide than the projected vapor-equilibrium concentration under the conditions of the gas stream as it exits the contact zone; contacting the coalesced droplets with gas stream having a concentration of sulfur dioxide below the projected vapor-equilibrium concentration under the conditions of the coalesced droplets; and removing the coalesced droplets from the contact zone before the sulfur dioxide in the coalesced droplets equilibrates with the gas stream.

2. The process of claim 1 wherein at least about 30 percent by volume of the droplets coalesce in the contact zone and the coalesced droplets contain, on average, at least about 10 mole percent greater concentration of the sulfur dioxide than that projected for the vapor-liquid equilibrium under the conditions of the gas stream as it exits the contact zone.

3. The process of claim 2 wherein about 30 to 70 volume percent of the droplets coalesce within the contact zone.

4. The process of claim 3 wherein at least a portion of the droplets is coalesced by contact with a surface within the contact zone.

5. The process of claim 4 wherein droplets have axial and radial velocity components and a portion of the droplets contacts the inner surface of the contact zone prior to the exit of the contact zone.

6. The process of claim 1 wherein the finely-divided droplets are initially projected countercurrent to the direction of flow of the gas stream.

7. The process of claim 1 wherein the finely-divided droplets are initially projected cocurrent to the direction of flow of the gas stream.

8. The process of claim 1 wherein the average diameter of the droplets is about 5 to 100 microns.

9. The process of claim 1 wherein the linear velocity of the gas stream in the contact zone is about 3 to 15 meters per second.

10. The process of claim 1 wherein at least about 30 volume percent of the droplets exit the contact zone with the gas stream.

11. The process of claim 1 wherein droplets have axial and radial velocity components and a portion of the droplets contacts the inner surface of the contact zone prior to the exit of the contact zone.

12. The process of claim 11 wherein the finely-divided droplets are initially projected countercurrent to the direction of flow of the gas stream.

13. The process of claim 11 wherein the finely-divided droplets are initially projected cocurrent to the direction of flow of the gas stream.

14. The process of claim 11 wherein the liquid sorbent comprises sorbent which has a non-linear vapor-liquid equilibrium relationship with respect to the at least one component and the vapor-liquid equilibrium relationship is below that predicted by Henry's law.

15. The process of claim 1 wherein the amine sorbent contains a salt group which is stable during contacting.

16. The process of claim 1 wherein the amine group of the amine sorbent comprise secondary or tertiary amines.

17. The process of claim 16 in which at least one amine group of the amine absorbent contains at least one hydroxyalkyl substituent.

18. The process of claim 1 wherein said tertiary diamine is selected from the group consisting of N,N',N'-(trimethyl)-N-(2-hydroxyethyl)-ethylene diamine and N,N,N',N'-tetramethyldiamine.

19. The process of claim 1 wherein said diamine is piperazine.

* * * * *